Aug. 9, 1949.   W. W. BROOKS   2,478,684
PIPE REPAIR UNIT
Filed Aug. 23, 1945

INVENTOR.
William W. Brooks
BY
R. J. Whelan
ATTORNEY.

Patented Aug. 9, 1949

2,478,684

UNITED STATES PATENT OFFICE 2,478,684

PIPE REPAIR UNIT

William W. Brooks, Ingleside, Tex.

Application August 23, 1945, Serial No. 612,257

2 Claims. (Cl. 138—97)

The present invention is directed to a method and apparatus for the joining of sections of pipe. More particularly, it provides a method and apparatus for repairing breaks in pipes carrying combustible materials under high pressure.

In the past much hazard has been connected with the repairing of breaks in lines carrying oil and gas. The practice has been to plug up the exposed ends of the pipe with mud plugs and then, after making things as clean as possible by removal of spilled oil and blowing away liberated gas, welding the pipe at the break. This was dangerous first because it is impossible to be sure that spilled gasoline, for example, has been sufficiently removed and, secondly, because there is the ever present danger of the mud plug leaking or giving way and jeopardizing the welders during the welding operation by virtue of the release of combustible material into the welding arc or flame. Then, too, in such an operation, after the weld is completed, the mud plugs must be pumped through the line and these often give trouble in passing through centrifugal pumps and gate valves.

It is the principal object of the present invention to provide a method and apparatus which makes possible the speedy repair of breaks of the aforesaid type without danger to the operator. An additional object of the present invention is to provide a method and apparatus for joining sections of pipe together for any reason in a speedy expeditious manner to produce a fluid tight joint.

Further objects and advantages of the present invention will appear from the following detailed description of the accompanying drawing; in which, Fig. 1 is a longitudinal section of pipe ends to be joined with the joint of the present invention installed;

Figure 1:
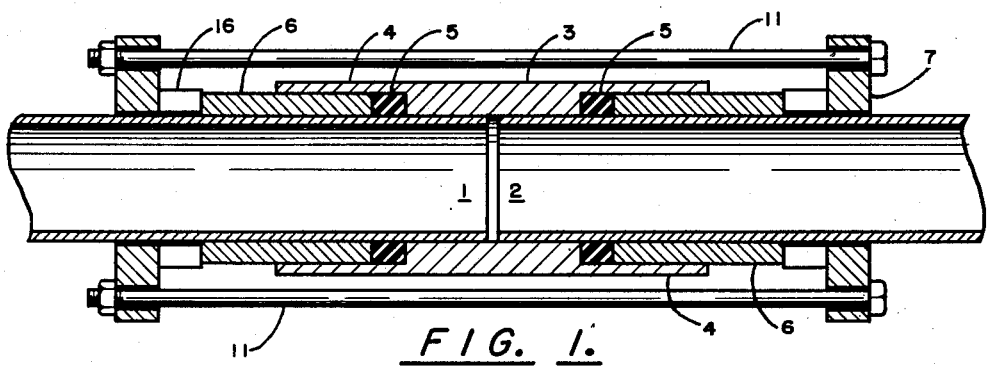
Figure 2:
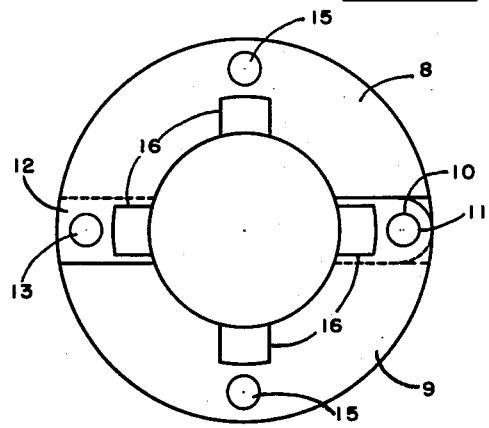
Fig. 2 is a face view of the inner face of one of the clamps shown in Fig. 1.
Figure 3:
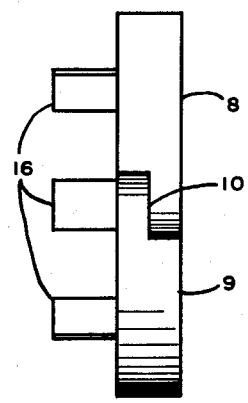
Fig. 3 is a side elevation of said clamp.

Referring to the drawing in detail, numerals 1 and 2 represent two pipe ends which in a special case may be assumed to be sections of the same pipe which has sprung a leak necessitating the sawing of the pipe in two for repair. Numeral 3 designates a sleeve snugly fitting the pipe ends and having at its either end a radially offset portion 4 projecting longitudinally a sufficient distance to provide an annular space around the pipe at each end of the sleeve. Seated on the inner end of this annular space against the ends of the sleeve are gaskets 5 of rubber or other suitable packing material.

Abutting against each gasket is a metal gland 6 of a thickness such as to fill the annular space between the ends 4 and the pipes. Arranged in abutting relation with the outer end of each gland is a clamp 7, each clamp being made of two semi-circular members 8 and 9 hinged at 10 on a bolt 11 and having overlapping ends 12, each provided with a hole 13 located so as to coincide with each other when the member is in closed position and to receive a bolt 14. Each of members 8 and 9 is also provided with an additional hole 15 arranged so as to be diametrically opposite each other and to receive additional bolts. Each of members 8 and 9 carries on its innerface two projecting lugs 16 arranged about 90° apart. These lugs are adapted to abut against the outer ends of the glands 6.

Assuming the sections of pipe shown to be part of the same pipe line which has sprung a leak, the two sections are sprung apart sufficiently to permit the slipping on of first the gland 6, then the gasket 5 on each end and then the sleeve 3 on one of the ends. The ends are then brought into alignment and the sleeve 3 is located in the position shown. Then the glands are pushed into place and the hinged clamping members 8 and 9 are applied. With the clamping members in the position shown in Fig. 1, the bolts 14 are tightened up thereby pressing the glands against the gaskets, and compressing the latter from its ends to produce a bulge in the middle forming a fluid tight seal between the members 4 and the pipes.

This assembly can be then left, as such, as a fluid tight coupling. Where the invention is applied to a pipe line carrying combustible fluid under pressure, after any fluid which has escaped has been carefully removed, the outer ends of members 4 are welded to the glands 6 and the outer ends of glands 6 are tack-welded to the pipe section. Then the clamps are removed and a full weld applied between the end of each gland 6 and the pipe section.

Figure 4:
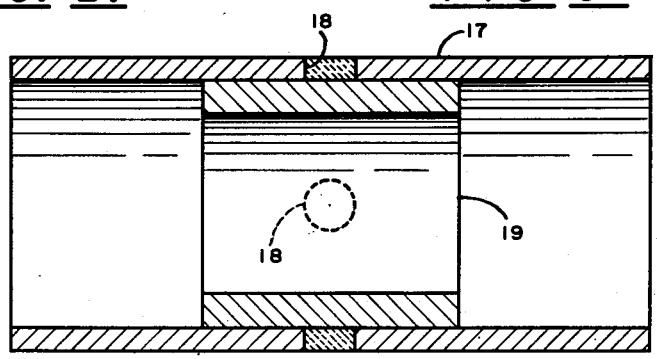
Fig. 4 is a longitudinal section through a special sleeve for use in the present invention.
Figure 5:
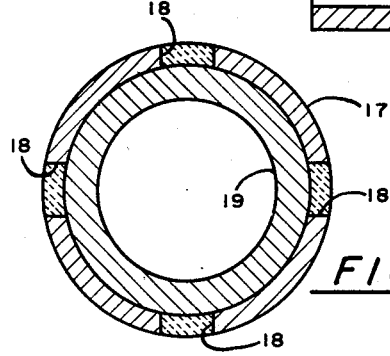
Fig. 5 is a cross sectional view of said sleeve.

In Figs. 4 and 5 there is shown a sleeve that can be used instead of sleeve 3 which, if machined out in the shape shown, would be expensive. This sleeve is formed simply by inserting in a length of pipe 17 having four holes 18 around its periphery intermediate its ends a shorter length of pipe 19. When pipe 19 is centered in pipe 17 it is spot-welded in place through the holes 18.

The nature and objects of the present invention having been fully described and illustrated, what I desire to claim is:

1. A method for repairing a leak in a pipe carrying fluid under high pressure, comprising cutting the pipe across at the point of the leak to form two sections with abutting ends, slipping on each section a gland and then a gasket, slipping on one of said sections a sleeve having a central portion snugly fitting the pipe and having at each end a longitudinally projecting offset portion which, together with the pipe, forms an annular space at either end of said sleeve, aligning the two sections of pipe, moving the sleeve to a position to cover the abutting ends of said pipe, forcing each gasket into its respective annular recess with its corresponding gland, applying pressure to the ends of said glands to compress said gasket and form a fluid tight joint around the point of juncture of said pipe sections, and welding said sleeve to said glands and said glands to said pipe sections.

2. A coupling for metallic pipe sections carrying fluid under pressure which comprises a tubular metallic sleeve having a portion intermediate its ends of an inner diameter so as to fit snugly on the pipe ends and having its either end of such an inner diameter as to be spaced radially from said pipe sections to form an annular recess, packing material in the recess so formed, a tubular metallic gland fitting in said recess and abutting against said packing, the said tubular metallic gland being adapted and to be welded to said sleeve and to said pipe sections, and clamping means comprising movable flanges around said pipe sections adjacent each of said glands and having a plurality of lugs bearing against said glands and spaced to permit welding said glands to said pipe sections, and a plurality of bolts to draw said flanges toward each other and apply longitudinal pressure to said glands.

WILLIAM W. BROOKS.

REFERENCES CITED

The following references are of record in the file of this patent:

UNITED STATES PATENTS

| Number | Name | Date |
| --- | --- | --- |
| 616,578 | Love | Dec. 27, 1898 |
| 817,300 | David | Apr. 10, 1906 |
| 865,056 | Palmer | Sept. 3, 1907 |
| 1,063,996 | Moore | June 10, 1913 |
| 1,371,632 | Latimer | Mar. 15, 1921 |
| 1,940,729 | Pfefferle | Dec. 26, 1933 |
| 2,163,810 | Raybould | June 27, 1939 |
| 2,203,237 | Raybould | June 4, 1940 |
| 2,269,695 | Scharf | Jan. 13, 1942 |